United States Patent [19]
Bright

[11] Patent Number: 5,462,180
[45] Date of Patent: Oct. 31, 1995

[54] BOTTLE BASE STAND

[75] Inventor: Stephen A. Bright, Troy, Ohio

[73] Assignee: Electra Form, Inc., Vandalia, Ohio

[21] Appl. No.: 185,113

[22] Filed: Jan. 21, 1994

[51] Int. Cl.⁶ .......................... B65D 1/02; B65D 23/08; B65D 25/24
[52] U.S. Cl. .................. 215/12.1; 215/400; 215/386; 220/605; 220/628; 220/636; 248/346.04
[58] Field of Search .................. 40/310; 248/346.1; 215/1 C, 100 R, 12.1, 100.5, 386, 393, 395; 220/628, 605, 633, 636

[56] References Cited

U.S. PATENT DOCUMENTS

| | | | |
|---|---|---|---|
| 71,565 | 11/1867 | Woodworth | 220/605 |
| 1,033,398 | 7/1912 | Heylandt | 220/628 X |
| 1,558,768 | 10/1925 | Sturges | 220/628 |
| 2,016,171 | 10/1935 | Matter et al. | 220/605 X |
| 2,044,093 | 6/1936 | Mills | 215/12.1 X |
| 3,480,168 | 11/1969 | Lee | 215/1 C |
| 3,722,725 | 3/1973 | Khetani et al. | 215/12.1 X |
| 3,726,429 | 4/1973 | Doughty | 215/1 C |
| 3,759,410 | 9/1973 | Uhlig | 215/1 C |
| 3,978,232 | 8/1976 | Dodsworth et al. | 215/1 C X |
| 4,082,200 | 4/1978 | Guest | 215/12.1 X |
| 4,138,026 | 2/1979 | Conklin | 215/12.1 |
| 4,281,769 | 8/1981 | Ignell | 215/1 C X |
| 4,331,246 | 5/1982 | Sorensen | 215/100 R X |
| 4,367,820 | 1/1983 | Yoshino et al. | 215/12.1 |
| 4,438,856 | 3/1984 | Chang | 215/1 C X |
| 4,463,860 | 8/1984 | Yoshino et al. | 215/12.1 |
| 4,612,712 | 9/1986 | Fumet | 40/310 |

FOREIGN PATENT DOCUMENTS

| | | | |
|---|---|---|---|
| 40269 | 11/1981 | European Pat. Off. | 215/121 |
| 1027607 | 5/1953 | France | 220/628 |
| 939816 | 3/1956 | Germany | 220/628 |
| 277741 | 12/1951 | Switzerland | 220/628 |
| 733427 | 7/1955 | United Kingdom | 220/628 |

Primary Examiner—Sue A. Weaver
Attorney, Agent, or Firm—Locke Reynolds

[57] ABSTRACT

A base stand for use with a plastic bottle having a hemispherical bottom includes a thin-wall cylindrical sheath portion and a thin toroidal-shaped base portion having a lowermost rim defining a seating ring. The sheath portion engages the side wall of the bottle and the toroidal-shaped base wall contacts and supports the bottle hemispherical bottom. The base stand is formed by bringing organic plastic material to orientation temperature and drawing the heated plastic material over a conical mandril to form a thin-wall tube. The resulting thin-wall tube is pressed against a forming plate to roll one end of the thin-wall tube in on itself to form a toroid.

13 Claims, 3 Drawing Sheets

BOTTLE BASE STAND

BACKGROUND OF THE INVENTION

The present invention relates to base stands for use in supporting fluid containers having generally hemispherical bottoms in an upright position and particularly to plastic base stands manufactured from recycled organic plastic material.

In recent years, plastic bottles have largely replaced glass bottles as the container of choice for holding pressurized fluids such as carbonated beverages. Typically, these plastic bottles are molded from polyethylene terephthalate (PET) material. However, due to the expense of the PET material, it is desirable to make the bottle as a whole, and particularly the side wall and bottom of the bottles using the least material possible consistent with the strength requirements for the bottle.

It is known that a hemispherical bottom can be employed to minimize the material employed. Unfortunately, a hemispherical bottom makes the bottle inherently unstable and requires a supporting structure to hold the bottle in the upright position. This is generally achieved by combining a base stand with the bottle. One method for adding a base stand is to integrate legs into the hemispherical bottom structure during the molding process as shown for example in U.S. Pat. No. 3,759,410. Unfortunately, extra material must be used in the molding process to ensure adequate material to form the legs which will retain their shape under the internal pressure of a carbonated liquid, adding as much as 10% additional material to the bottle and thereby increasing manufacturing costs. Food purity regulations require this additional material be virgin rather than recycled material since the integral legs are in direct contact with the contents of the container, Moreover, the formation of legs in the bottom of a bottle require more complex blow mold configurations which add to the complexity of the formation process, adding further cost.

Alternatively, base stands have been manufactured separately and joined to the bottle after the bottle has been formed. See, for example, U.S. Pat. Nos. 3,726,429; 4,138,026; 4,438,856; and 4,463,860. Currently, such base stands are typically injection molded from a virgin or recycled polyester resin to ensure recyclability of the container as a whole. Due to the flow characteristics of the polyester resin, the injection molding requires a certain minimum thickness in the molding cavity, typically in the order of about 0.006 inch. This minimum thickness permits the plastic to flow into, and fill, the cavity without blockage. Thus, injected molded base stands have a minimum wall thickness, dictated by the forming process rather than the physical limitations of the material used, which is excessive and thus stronger than necessary to perform its intended function. This excessive minimum wall thickness directly translates into excess material and therefore excess cost in the formation of the final product. A base stand that can be manufactured by a process that avoids the limitations of the injection molding process, using inexpensive, recycled materials to produce a thin-wall base stand would greatly reduce the manufacturing costs and would be welcome by bottle manufacturers. While some attempts have been made to vacuum form such base stands from thin sheet material, the process has not met with success.

SUMMARY OF THE INVENTION

According to the present invention, a base stand for use with a plastic cylindrical bottle comprises a unitary plastic member having an upper sheathe portion for engaging the bottle side wall and a toroidal base portion including a lowermost edge providing a seating ring for stable support of the bottle. The base stand is formed as a unitary thin-wall structure from an oriented plastic material, preferably recycled polyethylene terephthalate.

The bottle side wall includes a cylindrical wall which can have an upper portion with a first outer diameter and a lower portion having a second outer diameter that is less than the first outer diameter. The lower portion is joined to the hemispherical bottom. The upper and lower side wall portions form a perimetral lip or step at their junction.

The upper portion of the base stand is generally in the form of a thin-wall cylinder having an inner diameter substantially equal to the second outer diameter and an outer diameter substantially equal to the first outer diameter. The toroidal base portion includes an inner ring situated in contact with the generally hemispherical bottom of the bottle, the lower extremity of the bottle being maintained above the seating ring defined by the lowermost rim of the toroidal base portion.

A method of forming a thin-wall base stand in accordance with the present invention comprises the steps of providing a thin-wall tube of oriented organic plastic material and forming one end of the thin-wall tube into a base stand having a cylindrical side wall or sheathe portion and a generally toroidal-shaped base wall. In providing the thin-wall tube, a tube of orientable organic plastic material is brought to orientation temperature and the tube is then drawn over a mandril to biaxially orient the material and expand the tube into a thin-wall tube. The tube of orientable organic plastic material can be the direct product of a continuous extrusion process with the temperature of the extruded tube being modified to the orientation temperature prior to encountering the mandril. The thin-wall tube is cut to a predetermined length and urged against a forming plate to roll a first end of the thin-wall tube into a generally toroidal-shaped base wall. It is possible to cut the thin-wall tube either before or after the first end is rolled into the toroidal-shaped base wall. It is also possible to cut the tube to a predetermined length prior to orientation.

A plastic container according to the present invention comprises a bottle of plastic material having a shoulder and a side wall. The bottle side wall is integrally closed on a lower end with a hemispherical bottom wall having a lowermost extremity situated on the major rotational axis of the bottle. The bottle side wall extends from the shoulder to the bottom wall. The bottle side wall can include a upper portion having a first outer diameter and a lower portion having a second outer diameter with a perimetral ledge or step formed at the junction of the upper and lower portions.

A plastic container also includes a thin-wall plastic base stand attached to a lower portion of the bottle, the base stand having an upper sheathe portion and a generally toroidal base portion. The base stand sheathe portion is in the form of a thin-wall cylinder coaxially snugly received over the lower portion of the bottle side wall. The sheathe portion is formed integrally with the toroidal base portion. The sheathe portion includes an inner diameter substantially equal to the second outer diameter and an outer diameter substantially equal to the first outer diameter. The upper margin of the sheathe portion is preferably positioned to abut the perimetral ledge or step.

One feature of the present invention is the presence of the outer surface of the thin-wall cylinder which cooperates with the upper portion of the bottle side wall to form a label attachment surface that extends from the shoulder to the toroidal base portion. This feature has the commercial advantage of presenting a greater surface area, as compared to conventional bottles of similar capacity, for displaying advertizing, labels, logos or the like, without giving up the strength and economy of manufacture inherent in a hemispherical bottom bottle. Additional features and advantages of the invention will become apparent to those skilled in the art upon consideration of the following detailed description of a preferred embodiment exemplifying the best mode of carrying out the invention as presently known.

DETAILED DESCRIPTION OF THE DRAWINGS

Figure 1:
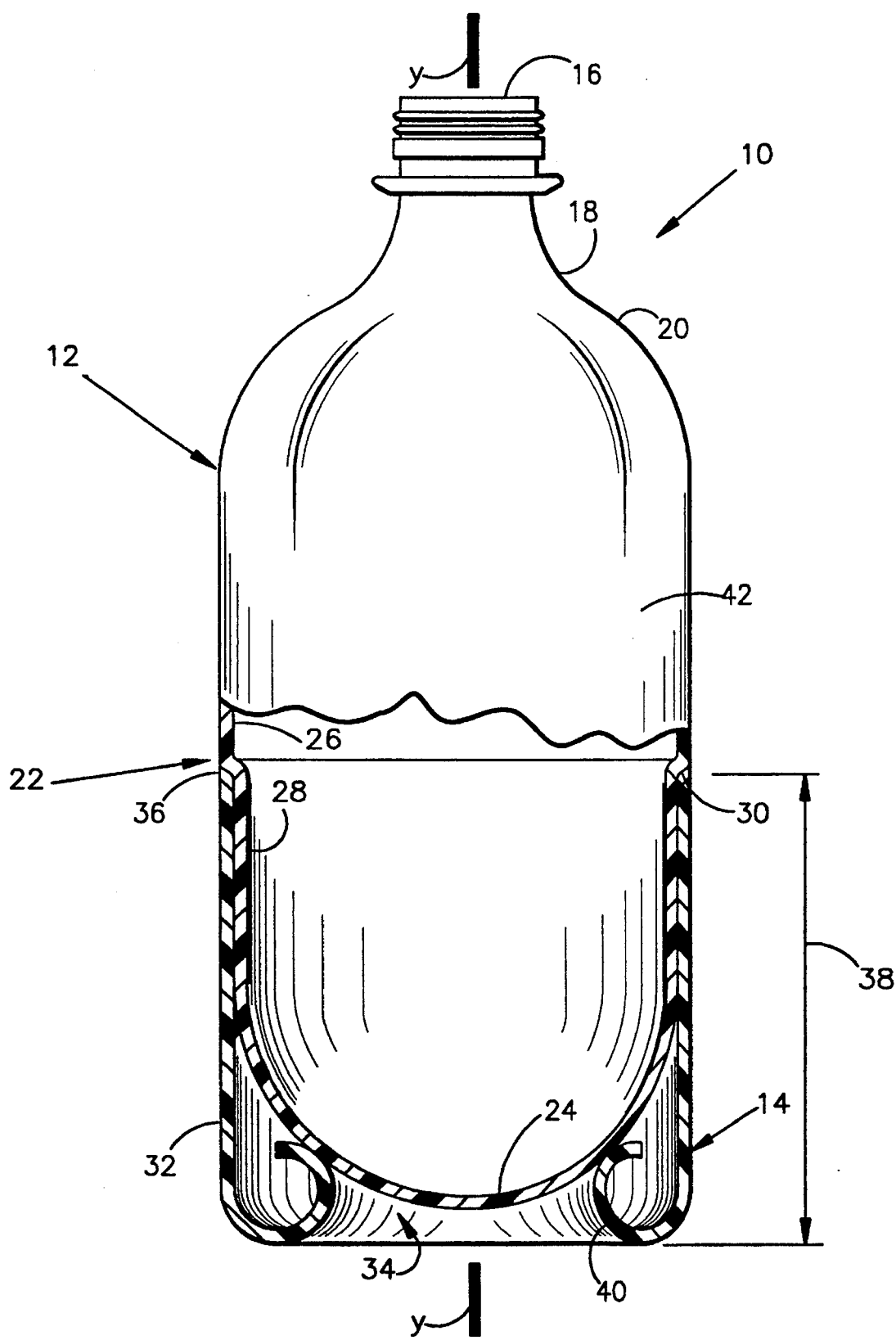
FIG. 1 is a side elevation of a plastic container of the present invention, partially broken away, incorporating the thin-wall base stand of the present invention, wherein the wall thickness of the bottle and base stand have been exaggerated to show details of the invention.
Figure 2:
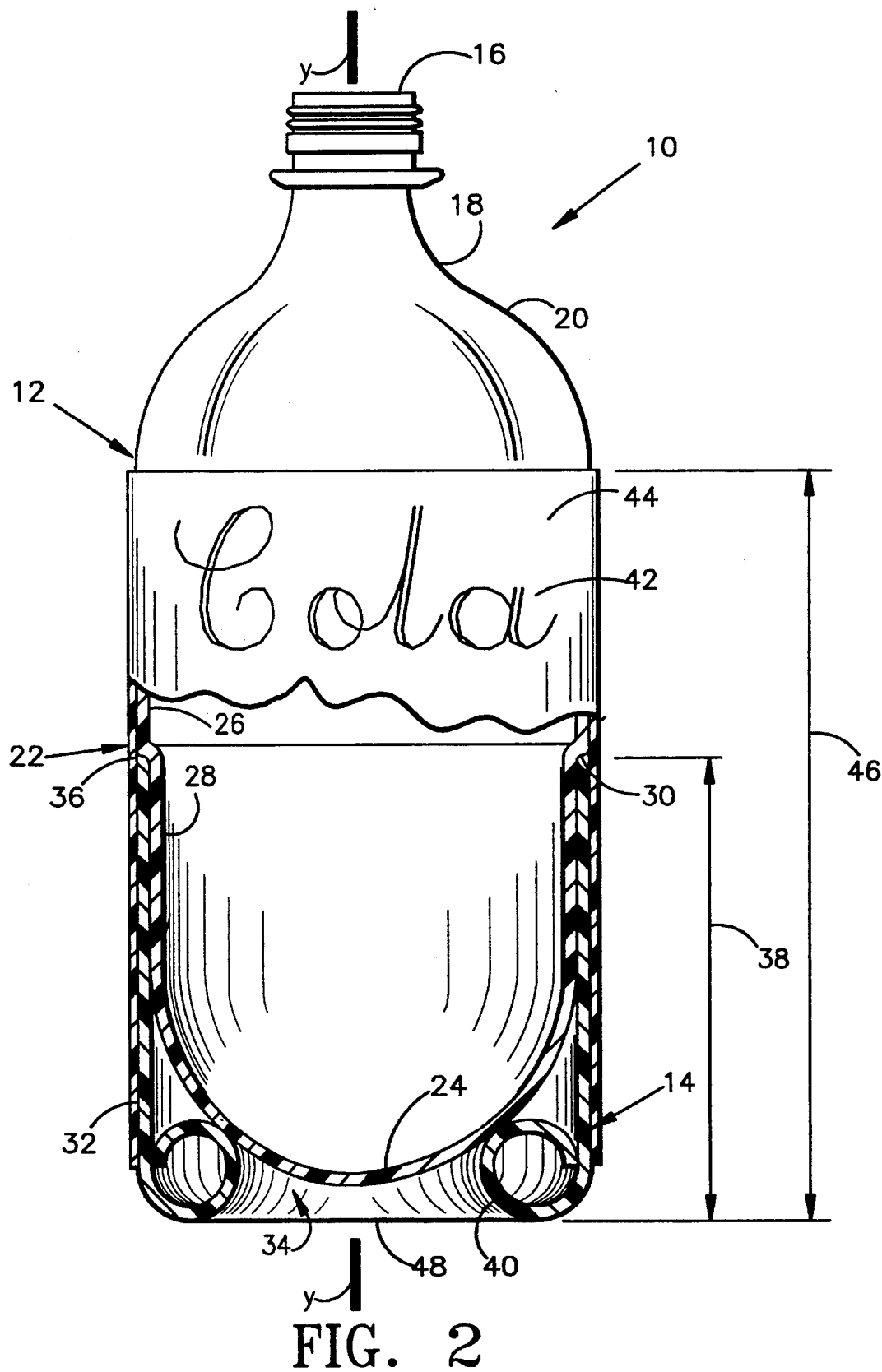
FIG. 2 is a side elevation similar to FIG. 1 with the thin-wall base stand having an annular base wall fully closed in on itself to form a toroid and including an enveloping label.

A plastic container 10 according to the present invention is shown in FIGS. 1 and 2 to include a bottle 12 and a thin-wall base stand member 14. The bottle 12 is made by well-known techniques for forming oriented-plastic containers from organic plastic material such as polyethylene terephthalate. The bottle 12 includes a top 16 having a pouring opening and a finish for receiving a closure (not shown). The bottle 12 also includes a neck 18 that blends into a shoulder 20, a cylindrical side wall 22 and a hemispherical bottom 24, the lowermost point of which is situated generally on the vertical rotational axis of symmetry Y-Y of the bottle. The side wall 22 extends between the shoulder 20 and the bottom 24, and includes an upper portion 26 having a first outer diameter and a lower portion 28 having a second outer diameter. The upper and lower portions 26, 28 are integrally molded together to form a downwardly facing perimetral ledge or step 30.

The base stand member 14 includes a sheathe portion 32 integrally formed with a generally toroidal base portion 34. The sheathe portion 32 and toroidal base portion 34 combine to define a predetermined height dimension 38. In order to provide stable support to the container 10, the height dimension 38 is enough to permit the sheathe portion 32 to engage the body side wall 22 and position the toroidal base portion 34 in contact with the hemispherical bottom 24.

The sheathe portion 32 has an upper end 36 configured to abut the perimetral ledge or step 30. The sheathe portion 32 also has an inner diameter substantially equal to the outer diameter of the bottle lower portion 28 and an outer diameter substantially equal to the outer diameter of the bottle upper portion 26. Thus, the sheathe portion 32 snugly fits against the second portion 28 of the bottle side wall 22 and, with the upper end 36 abutting the perimetral ledge or step 30, cooperates with the bottle upper portion 26 to form a nearly continuous cylindrical outer surface 42 extending from the shoulder 20 to the base portion 34.

The toroidal base portion 34 includes an annular wall portion 40 which extends directly from the sheathe portion 32 and curves in on itself to form a toroid or donut-shaped base. Preferably, the annular wall 40 is sized to support the bottle 12 by contacting the hemispherical bottom 24, wherein the contact points between the annular wall 40 and the bottom 24 define a circle around the bottom 24. It will be appreciated that the annular wall 40 can completely close in on itself, as shown in FIG. 2, or can partially close in on itself, as shown in FIG. 1. It will further be appreciated that the curvature of the annular wall 40 should be such that the seating ring 48 defined by the lowermost rim of the annular wall 40 is positioned below the lowermost extremity of the bottom 24 of the bottle 12.

Structurally, this feature allows the base member sheathe portion 32 to provide lateral support to the bottle side wall 22 while the annular wall 40 supports and protects the hemispherical bottom 24. Commercially, the continuous outer surface 42 advantageously offers a greater surface area, as compared to conventional bottles of similar capacity, for displaying advertizing, labels, logos or the like, without giving up the strength and low cost inherent in a hemispherical bottom bottle. FIG. 2 shows the added label 44 having a vertical dimension 46 extending from the bottom of the shoulder 20 to the top of the annular wall 40. The vertical dimension 46 substantially exceeds the comparable label height dimension on both conventional base cup supported containers and on integral footed containers.

Figure 3:
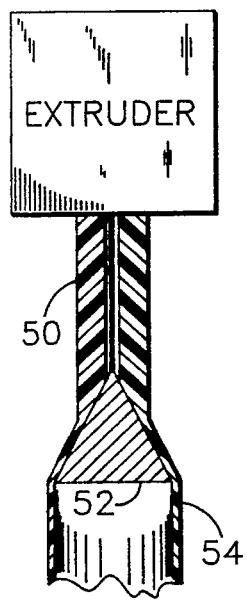
FIG. 3 illustrates a tube of plastic material passing over a warm mandril and being stretched into a thin-wall tube.

The base stand 14 is preferably made from a tube 50 of orientable organic plastic material. The tube 50 can be extruded and then cooled to orientation temperature or fixed lengths of previously formed tubing can be heated to orientation temperature. Once at orientation temperature, the tube 50 is then drawn over a warm conical mandril 52, as shown in FIG. 3 which radially expands the tube and orients the organic plastic material in the hoop direction. Drawing by pulling the tube over the mandril 52 extends the tube lengthwise thus biaxially orienting the organic plastic material to form thin-wall tube 54. The mandril 52 is sized to provide the thin-wall tube 54 having an inner diameter substantially equal to the outer diameter of the lower portion 28 of the bottle side wall 22.

Figure 4:
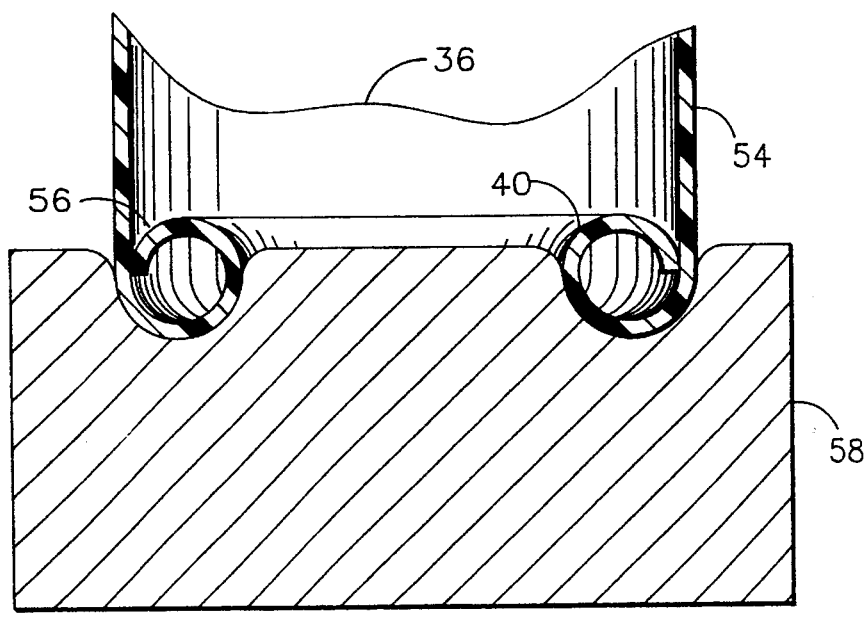
FIG. 4 is a section view taken through a forming plate showing the thin-wall tube being rolled in on itself to form the annular base wall.

After the thin-wall tube 54 is formed, one end 56 of the thin-wall tube 54 is pushed against a forming plate 58 to form the annular wall 40, as shown in FIG. 4. The forming plate 58 causes the end 56 of the thin-wall tube 54 to be rolled in on itself. It will be appreciated that the forming plate 58 can be used to roll the end 56 of the thin-wall tube 54 only partially on itself so that the annular wall 40 does not form a closed circle, as shown in FIG. 1. On the other hand, the forming plate 58 can complete close the annular wall 40, as shown in FIG. 2. In either case the forming will generally require that the portion of the tube 54 contacting the forming plate 58 be warmed sufficiently to permit the desired deformation. This warming can be achieved by heating the forming plate 58 to the required temperature.

The thin-wall tube 54 is cut to a predetermined length to allow the upper end 36 to abut the perimetral ledge or step 30, yet position the annular wall 40 in supporting contact with the hemispherical bottom 24, as shown in FIGS. 1–2. It will be understood that the tube can be cut to the desired length at any point in the process, and need not wait until the annular wall 40 is formed, as previously described.

Drawing the plastic material over the mandril 52 advantageously permits a thinner base member sheathe portion 32, compared with conventional base members formed by injection molding. The thickness of the sheathe portion 32 is determined by the mechanical properties of the plastic material rather than the requirements of the formation process. Consequently, less material can be used in the base stand member 14 of the present invention as compared with injection molded base stands, resulting in lower manufacturing costs. At the same time, the design of the base stand member 14 of the present invention imparts sufficient rigidity to the bottle 10 to enable the container to stand upright yet retains sufficient flexibility to absorb the impact if the container 10 is dropped. Of course, since the base stand member 14 does not come into food contact with the contents of the container 10, recycled organic plastic material can be used in the formation of the base stand member 14 to further reduce manufacturing costs.

Although the invention has been described in detail with reference to a certain preferred embodiment, variations and modifications exist within the scope and spirit of the invention as described in the following claims.

I claim:

1. A base stand for use with a plastic bottle having a generally cylindrical sidewall and a generally hemispherical bottom, the stand comprising a thin-wall unitary plastic member having an upper sheathe portion for engaging the bottle side wall, and a toroidal base portion including a toroidal surface segment for contacting the bottle hemispherical bottom and a lowermost rim providing a seating ring for stable support of the bottle.

2. The base stand of claim 1 wherein the unitary plastic member consists essentially of an oriented plastic material.

3. The base stand of claim 2 wherein the plastic material consists essentially of polyethylene terephthalate.

4. The base stand of claim 2 wherein the plastic material consists essentially of recycled material.

5. A plastic container comprising an integrally molded plastic bottle comprising a shoulder, a side wall, and a hemispherical bottom wall; and a base stand attached to the bottle, the base stand comprising a thin-wall unitary plastic member having an upper sheathe portion engaging the bottle side wall, and a toroidal base portion including a toroidal surface segment contacting the hemispherical bottom wall and a lowermost rim providing a seating ring for stable support of the bottle.

6. The container of claim 5 wherein the bottle side wall includes a first portion having a first outer diameter and a second portion having a second outer diameter; and the base stand sheathe portion includes an inner diameter substantially equal to the second outer diameter and an outer diameter substantially equal to the first outer diameter.

7. The container of claim 6 wherein the first and second portions abut each other to form a perimetral ledge in the bottle side wall and the base stand sheathe portion abuts the ledge and extends generally from the ledge downwardly therefrom, the base stand sheathe portion cooperating with the bottle first portion to form a label attachment surface extending from the shoulder to the toroidal base portion.

8. The container of claim 5 wherein a lowermost end of the hemispherical bottom wall is situated above the lowermost rim of the toroidal base portion.

9. The container of claim 5 further comprising a label enveloping the bottle and base stand the label having a vertical dimension extending from the bottle shoulder bottom to the toroidal base portion of the base stand.

10. A plastic container comprising an integrally molded plastic bottle comprising a shoulder, a side wall, and a substantially hemispherical bottom wall;

a base stand consisting essentially of a thin-wall unitary plastic member having an upper sheath portion engaging the bottle side wall and a toroidal base portion including a lowermost rim providing a seating rim for stable support of the bottle;

and a label enveloping the bottle and base stand, the label having a vertical dimension extending from the bottle shoulder to the toroidal base portion of the base stand.

11. The plastic container of claim 10 wherein a lowermost end of the hemispherical bottom wall is situated above the lowermost rim of the toroidal base portion, the toroidal base portion including a toroidal surface segment contacting the bottle hemispherical bottom.

12. The plastic container of claim 11 wherein the toroidal base portion exists essentially of an annular wall which is partially closed in on itself.

13. The plastic container of claim 11 wherein the toroidal base portion exists essentially of an annular wall which is completely closed in on itself.

* * * * *